Figure 1:
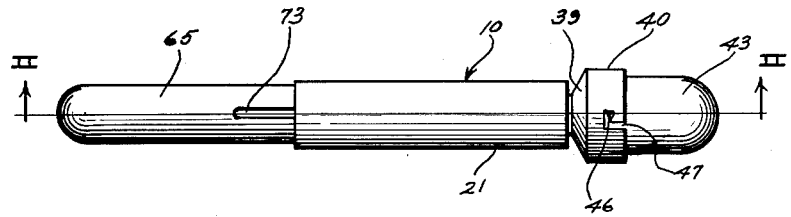

Jan. 16, 1962 EL ROY J. KRAFT 3,016,916
CONCENTRATE PROPORTIONER
Filed Oct. 9, 1957

Inventor
EL ROY J. KRAFT

United States Patent Office 3,016,916
Patented Jan. 16, 1962

3,016,916
CONCENTRATE PROPORTIONER
El Roy J. Kraft, Des Plaines, Ill., assignor to The Dole Valve Company, Morton Grove, Ill., a corporation of Illinois
Filed Oct. 9, 1957, Ser. No. 689,139
1 Claim. (Cl. 137—604)

This invention relates to improvements in proportioners for proportioning and dispensing liquids of different viscosities, such as concentrates and the like.

Heretofore, liquids of different viscosities have been mixed and dispensed by the suction created by the flow of fluid of lighter viscosity through a restricted orifice, such as a venturi and the like. While the proportioning principle has proven to be very satisfactory and has resulted in a uniformly mixed drink, the drink frequently has had a flat taste caused by the lack of air in the final drink.

It has been attempted to remedy this and cure the flat taste by creating a turbulence in the glass by the force of the mixed drink flowing into the glass. This, however, has not sufficiently aerated the drink to satisfactorily solve the problem.

It has also been attempted to provide a bleed hole in the concentrate inlet in an effort to aerate the mixed drink. This method of aerating the drink has proven to be unsatisfactory because the bleed hole reduces the suction to such an extent that the flow of the diluting fluid through the venturi is insufficeint to efficiently draw the concentrate through the venturi and mix with the concentrate with the required mixture, and where the size of the bleed hole has been reduced to increase the suction to the required extent, insufficient air is admitted to the concentrate to cure the flatness in taste of the drink.

It has been found, however, that where air is introduced on the downstream sides of the restriction or throat in the proportioning passageway by the pumping action of the mixed drink flowing through the spout of the proportioner, that the flatness of the drink is cured without impairing the efficiency of the proportioner.

A principal object of the invention, therefore, is to reduce the flatness of proportioner drinks, such as concentrates and the like by introducing air by the pumping action created by the mixed drink as it passes through the proportioning device therefor.

A further object of the invention is to provide a concentrate proportioner of the venturi type so arranged as to eliminate flatness of the drink by utilizing the mixed flowing drink as a jet pump to introduce air thereinto.

A still further object of the invention is to provide a concentrate proportioner operating on the venturi principle in which water is admitted on the upstream side of the throat of the venturi and concentrate is admitted through a tube terminating within the converging portion of the venturi downstream of the diluting water inlet thereinto, and in which an air inlet is provided downstream of the throat of the venturi, for introducing air into the mixed drink by the pumping action of the mixed drink as it flows through the discharge spout of the proportioner.

Figure 2:
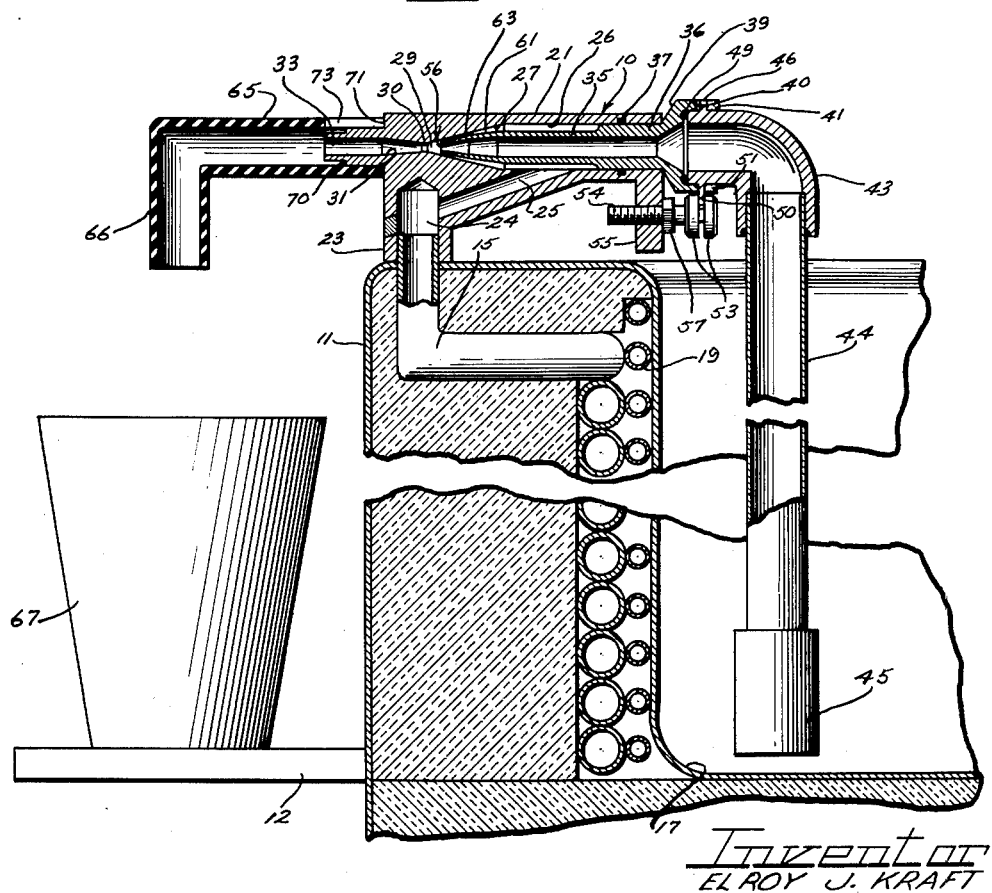

These and other objects of the invention will appear from time to time as the following specification proceeds and with reference to the accompanying drawing wherein:

FIGURE 1 is a top plan view of a venturi proportioner constructed in accordance with the invention; and FIGURE 2 is a vertical sectional view taken through the proportioner substantially along line II—II of FIGURE 1, and showing the proportioner mounted on a dispenser cabinet fragmentarily shown in section.

In the embodiment of the invention illustrated in the drawing, I have shown a proportioner 10 for proportioning liquids, such as concentrated fruit or vegetable juices, malts, liquors, colas, flavors and the like, and to dispense the proportioned liquids at the consistency of the natural fruit, vegetable or in the proper proportions for the selected drink.

The proportioner 10 may be mounted on a cabinet or casing 11 partially shown in vertical section in FIGURE 2, which may be mounted on a counter or like support. The cabinet 11 is shown as having a glass rest 12 projecting outwardly from the front wall 13 thereof and movably supported to operate a water valve (not shown) for supplying water at household pressures to the proportioner 10 through a pipe 15, to dilute or proportion a concentrate contained in a refrigerated tank 17 contained within the cabinet 11. The pipe 15 may have a flow control device (not shown) at its inlet end to compensate for variations in inlet pressures and may be coiled about refrigerating coils 19, provided for cooling the tank 17 as in an application Serial No. 637,753, filed by Phillip R. Grimm on February 1, 1957, and entitled "Variable Concentrate Proportioner," so not herein shown or described further.

The proportioner 10 includes a body 21 which may be made from one of the well known thermoplastic materials, preferably a transparent material, such as Lucite or a like material, to enable the detection of dirt within the body. The proportioner body 21 may be mounted on the cabinet 11 in any suitable manner and has a depending lug 23 which may form a support for the proportioner and which has a passageway 24 leading thereinto and forming an inlet passageway for diluting liquid under pressure, such as water at household pressures. The passageway 24 is suitably connected at its inlet end to the end of the pipe 15. The passageway 24 has communication with an angular passageway 25 leading angularly rearwardly and upwardly along the body 21 and having flow communication with a generally cylindrical passageway 26 leading along the proportioner body 21 and opening to the outside of said body at the outer end thereof. The passageway 26 terminates at its inner end into a converging wall portion 27 of a venturi 29, forming an axial continuation of the passageway 26.

The converging wall portion 27 terminates into a throat 30 of the venturi, 29 which in turn terminates into a diverging wall portion 31 of the venturi having communication at its outlet end with a generally cylindrical passageway 33 opening to the end of the proportioner body.

The passageway 26 is shown as having a concentrate tube 35 extending therealong and mounted therein on an enlarged diameter portion 36 of the concentrate tube 35 and sealed to the passageway 26 as by an O-ring 37. The concentrate tube 35 has an outwardly flared receiving end portion 39 outside of the end of the proportioner body 21 terminating into an inlet fitting 40, the interior of which forms a socket 41 for receiving an elbow 43 having a suction tube 44 suitably connected thereto and depending therefrom within the concentrate tank 17. The suction tube 44 has an inlet end 45 adjacent and opening to the bottom of the concentrate tank 17.

The elbow 43 is shown as having a pin 46 extending upwardly therefrom fitting within a bayonet slot 47 formed in the cylindrical wall of the inlet fitting 40 and opening to the rear of the concentrate tube and accommodating the elbow 43 to be detachably connected to said inlet fitting. A suitable seal 49, such as an O-ring seal may be recessed within the inner end of the socket 41, to be engaged by the forward end of the elbow 43 when connected in said socket, to seal said elbow from the leakage of fluid from said socket.

The elbow 43 is shown as having an ear 50 depending therefrom and extending transversely thereof within a slot 51 formed in the lower end portion of the inlet fitting 40. The ear 50 is shown in FIGURE 2 as extending between spaced heads 53 of an adjustment screw 54, threaded within a support leg 55, depending from the proportioner body 21 adjacent the rear end thereof, for adjusting the position of a discharge end 56 of the concentrate tube 35 with respect to the converging wall portion 27 of the venturi 29. A lock nut 57 is provided to lock the adjustment screw 54 and the concentrate tube 35 in position.

The concentrate tube 35 is spaced radially inwardly from the passageway 26 and has a tapered end portion 61 tapering at a relatively flat angle with respect to the axis of said tube and increasing its taper at the discharge end thereof at an angle shown as being substantially equal to the included angle of the coverging portion 27 of the venturi, as indicated by reference character 63. The concentrate tube 36 may thus be moved rather close to the throat 30 of the venturi, and as the end of said concentrate tube is moved toward the throat 30 of the venturi the tapered end 63 of said concentrate tube cooperating with the converging wall portion 27 of the venturi will act as a valve and reduce the flow of water along the venturi.

It should here be understood that due to the configuration of parts and their unique location in the proportioning body, suction is developed at the end of the concentrate tube 35 and not at the venturi throat 30. The pressurized diluting water passing along the converging wall portion 27 in the annular space between said wall portion and the tapered end 63 of the concentrate tube will create a vacuum cone as the water flows beyond the end of the suction tube 35 and draw and mix the concentrate with the diluting water. The throat 30 is provided principally to insure full fluid flow through the venturi and to provide the required pressure drop to draw air to mix with the mixed liquid as the mixed liquid passes through a spout 65, as will hereinafter be more fully described as this specification proceeds. The spout 65 has a discharge end portion 66 extending at right angles to the axis of the venturi 29 to reduce the velocity of the mixed liquid as it is discharged into a glass 67 on the glass rest 12.

It should here be understood that at a certain critical position of the discharge end of the suction tube 35 with respect to the throat 30 of the venturi, the flow of water along the venturi will create a maximum vacuum for a given water pressure. Adjustment of said suction tube away from this position in either direction will reduce the vacuum with a resultant variation in the proportions of the concentrate dispensed through the spout 65. As the tube 44 is moved from its critical position at which the vacuum is at a maximum toward the throat 30 the water flow will be reduced. This with the resultant decrease in vacuum, will result in a stronger solution, since the flow of water is reduced at a proportionally greater rate than the vacuum.

Movement of the discharge end portion of the concentrate tube 35 away from the throat of the venturi from its critical position of maximum vacuum, will result in a reduced vacuum in the concentrate tube 35, but an increase in the water flow, resulting in a weaker solution.

The solution may, therefore, be made stronger or weaker in accordance with the proportions required to mix the proper drink, by operation of the adjustment screw 54 to adjust the position of the discharge end 56 of the concentrate tube 35 with respect to the throat 30 of the venturi 29.

Referring now in particular to the means for introducing air into the mixture by the pumping action of the mixture as it leaves the discharge passageway 33 of the venturi, the spout 65 is shown as being mounted on a reduced diameter wall portion 70 encircling the passageway 33 and as abutting a shoulder 71 of the proportioner body 21. The spout 65, as herein shown, has an air passageway 73 leading therethrough from the top thereof to the interior of said spout, and shown in FIGURE 2 as terminating at substantially the end of the outlet passageway 33. The shape of the air passageway 73 is immaterial insofar as the efficiency of the mixture of air with the mixed concentrate is concerned, although it is preferable said air passageway be located at or slightly behind the discharge end of the passageway 33 to take advantage of the suction created by the mixed concentrate as it leaves the end of said passageway and tends to expand to the enlarged diameter interior of the spout 65. It should also be understood that while the spout 65 is shown as being detachably mounted on the proportioner body 21 that it need not be detachably mounted thereon, but may be formed integrally therewith, if desired.

It may be seen from the foregoing that a simplified form of concentrate proportioner and dispenser has been provided in which suction is created at the vacuum cone at the end of the tube 35 to draw the concentrate into the proportioner body 21 for dilution with water and the mixed and diluted concentrate serves to draw air for mixture thereinto at the discharge end of the venturi, by the jet pumping action of expansion of the mixture of concentrate and water discharged under pressure from the end of the venturi.

It will be understood that modifications and variations in the present invention may be effected without departing from the spirit and scope of the novel concepts thereof.

I claim as my invention:

A proportioner for mixing and dispensing liquids of different viscosities comprising a proportioner body, a passageway extending through said body having a throat and having a converging wall portion converging in a downstream direction to said throat and having a diverging wall portion diverging in a downstream direction from said throat, a suction tube sealed to said body and having a portion extending within said passageway in spaced relation from the inner walls thereof and terminating within said converging wall portion of said passageway, means for supplying a first liquid under pressure to said passageway between the inner walls thereof and said suction tube to provide flow of same under pressure in a reducing annular flow path concentrically of said tube along the outer surface thereof and to provide a suction zone inside said reducing annular flow path at the end of said suction tube in the converging portion of said passageway to draw a second liquid through said suction tube for mixing with said first liquid, a hollow fitting secured to said proportioner body having a flow passage in communication with said diverging wall portion of said passageway and having a horizontally extending portion, wherein the minimum inner diameter of said flow passage is greater than the maximum diameter of said diverging wall portion of said passageway, means forming an extension from said proportioner body extending into but spaced from the wall of said flow passage within the said horizontally extending portion thereof, and atmospheric venting means formed solely within the uppermost surface of the horizontally extending portion of said fitting and upstream of the outermost end of said means for venting the interior of said flow passage to the atmosphere.

References Cited in the file of this patent

UNITED STATES PATENTS

| | | |
|---|---|---|
| 1,922,920 | Aherne | Aug. 15, 1933 |
| 2,483,951 | Watson | Oct. 4, 1949 |
| 2,719,704 | Anderson | Oct. 4, 1955 |
| 2,724,583 | Targash | Nov. 22, 1955 |
| 2,738,962 | Goodrie | Mar. 20, 1956 |
| 2,760,821 | Kenney | Aug. 28, 1956 |
| 2,764,455 | Seibel | Sept. 25, 1956 |
| 2,766,910 | Bauerlin | Oct. 16, 1956 |

FOREIGN PATENTS

| | | |
|---|---|---|
| 431,706 | Great Britain | July 15, 1935 |